United States Patent
Gerna et al.

(10) Patent No.: US 10,141,764 B2
(45) Date of Patent: Nov. 27, 2018

(54) BATTERY CHARGING REGULATOR

(71) Applicant: Dialog Semiconductor (UK) Limited, London (GB)

(72) Inventors: Danilo Gerna, Cortaillod (CH); Enrico Pardi, Cascina (IT); Giovanni Tarroboiro, Bientina (IT); Marcus Weis, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 61 days.

(21) Appl. No.: 15/335,934

(22) Filed: Oct. 27, 2016

(65) Prior Publication Data

US 2017/0126026 A1 May 4, 2017

(30) Foreign Application Priority Data

Oct. 28, 2015 (DE) .................. 10 2015 221 101

(51) Int. Cl.
*H02J 7/00* (2006.01)
*H02M 3/156* (2006.01)
*H02M 1/00* (2006.01)

(52) U.S. Cl.
CPC ............ *H02J 7/007* (2013.01); *H02J 7/0052* (2013.01); *H02J 7/0077* (2013.01); *H02J 2007/0059* (2013.01); *H02M 3/156* (2013.01); *H02M 2001/0045* (2013.01)

(58) Field of Classification Search
CPC ......... H02J 7/007; H02J 7/0052; H02J 7/0077
USPC ........................................................ 320/107
See application file for complete search history.

(56) References Cited

U.S. PATENT DOCUMENTS

| 5,192,905 | A | * | 3/1993 | Karlin | ..................... | H02J 7/022 |
| | | | | | | 320/145 |
| 8,633,677 | B2 | * | 1/2014 | Kim | ...................... | H02J 7/0031 |
| | | | | | | 320/134 |
| 9,242,567 | B2 | * | 1/2016 | Kim | ..................... | B60L 11/1811 |
| 2003/0180997 | A1 | * | 9/2003 | Nakayama | ....... | H03K 17/08128 |
| | | | | | | 438/200 |

(Continued)

FOREIGN PATENT DOCUMENTS

CN 102075088 5/2011

OTHER PUBLICATIONS

German Office Action, File No. 10 2015 221 101.0, Applicant: Dialog Semiconductor (UK) Limited, dated Jul. 4, 2016, 8 pgs and English language translation, 9 pgs.

*Primary Examiner* — M'Baye Diao
(74) *Attorney, Agent, or Firm* — Saile Ackerman LLC; Stephen B. Ackerman

(57) ABSTRACT

A battery charging regulator for use with a charger. The regulator comprises a switch element coupled to a control-circuit and to an adjuster-circuit. The switch element is adapted to selectively couple an input provided by a DC-DC converter with an output for a battery. The switch element comprises a control terminal and first and second path terminals located at a first and a second end of a conductive path respectively. The control-circuit is adapted to adjust an input to the control terminal to regulate at least one of a charge current and a charge voltage supplied to the battery via the conductive path. The adjuster-circuit is adapted to sense an electrical parameter of the switch element; and to adjust a value of the input provided by the DC-DC converter based on the sensed electrical parameter value.

25 Claims, 8 Drawing Sheets

(56) References Cited

U.S. PATENT DOCUMENTS

| | | | |
|---|---|---|---|
| 2008/0013345 A1* | 1/2008 | Takeshita | H02J 7/0065 |
| | | | 363/21.01 |
| 2012/0081068 A1* | 4/2012 | Odaohhara | H02J 7/045 |
| | | | 320/107 |
| 2012/0194141 A1* | 8/2012 | Shi | H02M 3/157 |
| | | | 320/137 |
| 2012/0319643 A1 | 12/2012 | Wang | |
| 2014/0145504 A1 | 5/2014 | Kayama | |
| 2014/0210402 A1* | 7/2014 | Sakita | H02M 3/1584 |
| | | | 320/107 |
| 2015/0137774 A1 | 5/2015 | Weis et al. | |
| 2015/0138842 A1 | 5/2015 | Knoll et al. | |

* cited by examiner

BATTERY CHARGING REGULATOR

TECHNICAL FIELD

The present disclosure relates to a battery charging regulator for use with a linear charger.

BACKGROUND

A linear battery charger uses a mains power supply and a DC/DC converter for charging a battery with a constant current in an initial phase using a pass device. Linear chargers present a number of advantages compared to other types of chargers. In particular, linear chargers have a compact and relatively simple design which permits manufacturing at a relatively low cost. However, one noticeable drawback of linear chargers lies in their excessive power dissipation due to the fact that the pass device might not be completely open, especially for low charging current.

When charging a battery with constant current, any device between the DC-DC converter and the battery is responsible for losses. In principle these losses are not very severe; however, heating might be an issue and might limit a maximum current that the charger can deliver. In avoiding the use of external components, there are two different approaches to charge a battery at constant current.

A first approach involves controlling the battery charger current directly at DC/DC level. The charge current is controlled using a switch, typically a pMOS pass transistor located between the battery and the DC/DC converter. A disadvantage of this approach is that a precision of the charge current is reduced at low charge current values. To address this issue one common method is to sense the charge current by mirroring the output current with a scaled device. For example, the scale device may be a sense transistor having a smaller physical size than the pass transistor. However, for low charge currents, a small drain-source voltage $V_{DS}$ mismatch between the pass transistor and the sense transistor might result in a large error in setting the charge current.

A second approach involves using a Low Dropout (LDO) regulator to control the output current. In this case, the precision of the charge current is maintained across an entire range of current values; however power dissipation becomes an issue. The instant the output current decreases, a difference between the gate-source voltage and threshold voltage ($V_{GS}$-$V_{TH}$) of the pass transistor is reduced by a constant current loop, resulting in a significant increase in dissipated power.

SUMMARY

It is therefore desired to provide a battery charging regulator capable of reducing power dissipation without compromising on a level of precision of control of a charge current. In accordance with a first aspect of the disclosure there is provided a battery charging regulator for use with a charger comprising: a switch element comprising a control terminal and first and second path terminals located at a first and a second end of a conductive path respectively; the switch element being adapted to selectively couple an input provided by a DC-DC converter with an output for a battery; a control-circuit coupled to the switch element, adapted to adjust an input to the control terminal to regulate at least one of a charge current and a charge voltage supplied to the battery via the conductive path; and an adjuster-circuit coupled to the switch element, adapted to sense an electrical parameter of the switch element; and to adjust a value of the input provided by the DC-DC converter based on the sensed electrical parameter value.

Optionally, the adjuster-circuit may comprise a comparison circuit adapted to compare the electrical parameter of the switch element with at least one reference value; and a controller connected to the comparison circuit adapted to control the input provided by the DC-DC converter, based on a comparison result obtained by the comparison circuit.

Optionally, the comparison circuit may be adapted to send a signal to the controller to reduce a value of the input provided by the DC-DC converter upon identifying the electrical parameter of the switch element is greater than the at least one reference value.

The at least one reference value may be obtained from a saturation curve reference. For example, the saturation curve may be a gate voltage versus overhead voltage curve.

Optionally, the at least one reference value includes a low reference value and a high reference value, wherein the high reference value is greater than the low reference value and wherein the comparison circuit is adapted to send a signal to the controller to perform at least one of increasing the value of the input provided by the DC-DC converter upon identifying an electrical parameter value less than the low reference value; maintaining the value of the input provided by the DC-DC converter upon identifying an electrical parameter at least equal to the low reference value and less than the high reference value; and reducing the value of the input provided by the DC-DC converter upon identifying an electrical parameter greater than the high reference value.

Optionally, the comparison circuit may be adapted to calculate an average value of the electrical parameter of the switch element, and wherein the signal is based on the average value.

Optionally, the comparison circuit may be adapted to generate a logical value associated with the electrical parameter based on a comparison of the electrical parameter with the at least one reference value.

Optionally, the control circuit may comprise a scaled switch element, the scaled switch element being smaller than the switch element, an operational amplifier, and a current generator. For example, the scaled switch element may be 1000-10000 times smaller than the switch element.

Optionally, the control terminal may be a gate, the first path terminal may be a source and the second path terminal may be a drain and wherein the input provided by the DC-DC converter provides a source voltage of the switch element.

Optionally, the control circuit may be adapted to maintain the charge current at a constant value regardless of the source voltage of the transistor.

Optionally, the adjuster-circuit may be adapted to adjust the value of the input provided by the DC-DC converter iteratively towards a threshold value.

Optionally, the electrical parameter of the switch element may comprise a bias of the switch element. The bias may be a gate voltage of the switch element.

Optionally, the electrical parameter of the switch element may comprise a value of the charge current.

Optionally, the adjuster-circuit may be adapted to operate at a first frequency and the control-circuit may be adapted to operate at a second frequency, wherein the first frequency is less than the second frequency. For example, the first frequency may be about one order of magnitude lower than the second frequency. The first frequency may be about 1 Hz.

Optionally, the adjuster-circuit may comprise a feedback controller coupled to at least one of an Analogue to Digital Converter and an operational amplifier. For example, the feedback controller may be a proportional integral derivative controller.

In accordance with a second aspect of the disclosure there is provided a method of operating a charger comprising: providing a switch element adapted to selectively couple an input provided by a DC-DC converter with an output for a battery; sensing an electrical parameter of the switch element; and adjusting a value of the input provided by the DC-DC converter based on the sensed electrical parameter.

Optionally, adjusting may comprise comparing the electrical parameter of the switch element with at least one reference value; and reducing a value of the input provided by the DC-DC converter upon identifying the electrical parameter of the switch element is greater than the at least one reference value by sending a signal to a controller.

Optionally, the at least one reference value may include a low reference value and a high reference value, wherein the high reference value is greater than the low reference value. In some embodiments, the method may further comprise sending a signal to a controller to perform at least one of increasing the value of the input provided by the DC-DC converter upon identifying an electrical parameter value less than the low reference value; maintaining the value of the input provided by the DC-DC converter upon identifying an electrical parameter at least equal to the low reference value and less than the high reference value; and reducing the value of the input provided by the DC-DC converter upon identifying an electrical parameter greater than the high reference value.

Optionally, the method may further comprise calculating an average value of the electrical parameter of the switch element, and wherein the signal is based on the calculated average value.

Optionally, the method may further comprise generating a logical value associated with the electrical parameter based on a comparison of the electrical parameter with the at least one reference value.

Optionally, the switch element may comprise a source; wherein adjusting the value of the input provided by the DC-DC converter comprises adjusting a source voltage of the switch element.

Optionally, adjusting the source voltage of the switch element may be performed iteratively towards a threshold value.

Optionally, the threshold value may be a minimum voltage value sufficient to maintain operation of the control circuit.

Optionally, sensing an electrical parameter of the switch element comprises sensing a bias of the switch element. For example, the switch element may comprise a gate, wherein the bias provides a gate voltage of the switch element.

Optionally, sensing an electrical parameter value of the switch element comprises sensing the charge current.

Optionally, adjusting a value of the input provided by the DC-DC converter is performed at a frequency that is less than a frequency of operation of a control circuit adapted to regulate at least one of the charge current and a charge voltage supplied to the battery.

In accordance with a third aspect of the disclosure there is provided a charger for charging a battery comprising a DC-DC converter and a battery charging regulator according to the first aspect of the disclosure.

In accordance with a fourth aspect of the disclosure there is provided a portable electronic device comprising a charger according to the third aspect of the disclosure. For example, the portable electronic device may be mobile phone or a personal digital assistant, PDA.

BRIEF DESCRIPTION OF THE DRAWINGS

The disclosure will be described below, by way of example only, with reference to the accompanying drawings, in which.

DESCRIPTION

Figure 1:
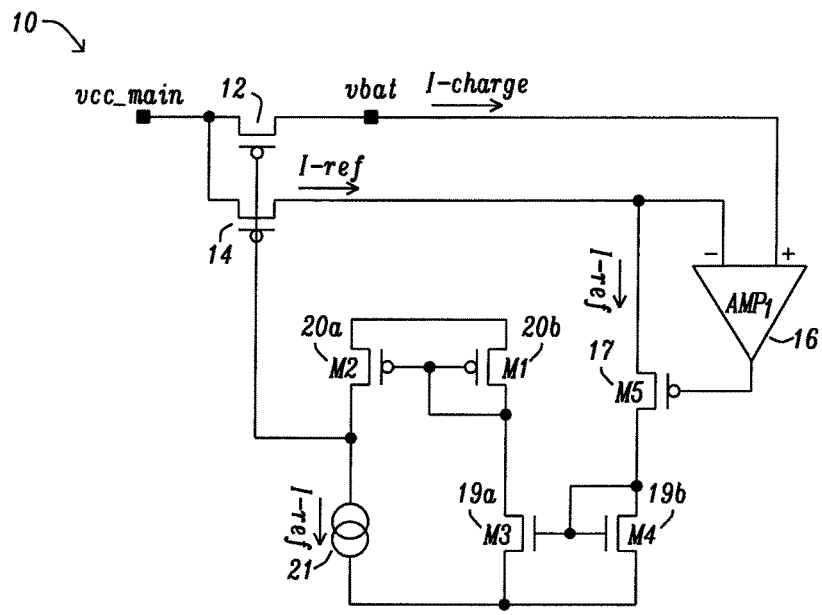
FIG. 1 is a diagram of a pass transistor control-circuit.

FIG. 1 shows a diagram of a pass transistor control-circuit 10 also referred to as current-control loop, for use between a DC/DC converter and a battery. The circuit 10 has a pass transistor 12, a sense-transistor 14, an operational amplifier 16, a pMOS transistor 17, two current-mirrors 19 and 20 respectively, and a current generator 21. The pass-transistor 12 has a source coupled with a DC/DC converter (not shown) and a drain coupled with a battery to be charged (not shown). A gate of the pass-transistor 12 is coupled to a gate of the sense-transistor 14. The source of the sense-transistor 14 is connected to the source of the pass-transistor 12. The operational amplifier 16 has non-inverting input connected to the drain of the pass-transistor 12, and an inverting input, also referred to as input reference, connected to the drain of the sense transistor 14 and to the drain of the transistor 17. The output of operational amplifier 16 is connected to a gate of pMOS transistor 17. The first current-mirror 19 comprises nMOS transistors M3 and M4 (19a, 19b respectively) and the second current mirror 20 comprises pMOS transistors M1 and M2 (20b, 20a respectively). First and second current mirrors are coupled to each other and to the reference current generator 21.

In use the DC/DC converter outputs a stable main voltage Vcc. The battery voltage Vbat experiences slow variations as the battery charges or discharges. These variations can lead to inaccuracies in charge current, especially when the charge current is set at a relatively low value. Using the circuit 10, the precision of a charge current may be maintained across a wide range of charge current values.

In the circuit 10, the pass transistor 12 and the sense transistor 14 are biased in the same conditions. This is achieved using the operational amplifier 16 and the transistor 17 to minimise a difference between the drain voltage of the pass transistor 12 and the drain voltage of the sense transistor 14. For example, if the drain voltage of the sense transistor 14 decreases, the operational amplifier 16 measures a difference between the drain voltage of the pass transistor 12 and the drain voltage of the sense transistor 14. The operational amplifier 16 then increases its output voltage in order to increase the gate voltage of the transistor 17. This increases the drain voltage of the sense transistor 14 until the voltage difference measured by the operational amplifier 16 is zero. As a result, the drain voltage of the pass transistor 12 and the drain voltage of the sense transistor 14 have a substantially identical values.

The circuit 10 is used to control an amount of current flowing through the pass device 12 by varying a value of a reference current Iref delivered by the current generator 21. The reference current Iref is mirrored across transistor 17, via the first and second current mirrors. In steady conditions, the high gain negative control loop forces the transistors 20a, 20b, 19a and 19b to draw the same current. Starting from current Iref, a current I20a across transistor 20a of the second current mirror is equal to the reference current Iref. Since the first and the second current mirrors are adapted to draw the same current, the current I19b across transistor 19b is equal to I20a, hence equal to Iref. Transistors 17 and 14 are forced to draw the same current, therefore current I17 across transistor 17 and current I14 across transistor 14 are each equal to Iref. Since the sense transistor 14 and the pass transistor 12 are biased in the same condition, the charge current I-charge drawn by the pass transistor 12 is directly proportional to the reference current Iref drawn by the sense transistor 14 such that I-charge=I-ref×Cst. The constant multiplication factor is defined by the relative physical size of the pass transistor 12 compared to the sense transistor 14 and can be calculated as the ratio of the size pass transistor/size sense transistor. The size of the pass transistor may for example be three orders of magnitude larger than the size of the sense device. In a specific example the pass transistor 12 is 6000 times larger than the sense device 14, and the charge current is 6000 times I-ref. For a reference current of 1 mA the charge current is 6A.

If current Iref is reduced, then 120a across transistor M2 also decreases and the gate voltage Vg, common to the sense transistor 14 and to the pass transistor 12, decreases. As a result, the charge current is reduced. In a similar fashion, if current Iref is increased, then 120a across transistor M2 increases and the gate voltage Vg common to the sense transistor 14 and to the pass transistor 12 increases. Therefore, the charge current is increased.

As mentioned above the voltage across the pass transistor 12 is established by the voltage output Vcc of a DC/DC converter (such as a buck). Depending on such a voltage the loop of circuit 10 reacts by setting the gate voltage Vg of transistors 14 and 12 in order to draw the desired current as defined by Iref. In this way the control circuit 10 maintains the charge current at a constant value regardless of the value of Vcc_main.

For high charge current values it may not be possible to reduce Vds across the pass transistor. In this case the only way of reducing power dissipation is to lower the charge current intensity. In contrast, the charge current drawn by the pass transistor 12 is independent of Vcc_main. By reducing Vcc_main the gate voltage of transistors 12 and 14 decreases. This has for effect to reduce the respective on-resistance, Ron, of the transistors 12 and 14, hence reducing power dissipation. For a maximum charge current Idmax, there is a minimum Vdsmin that, in a worst case condition, allows the current generator 21 to work correctly. For illustrative purposes, when considering the former example of a pass transistor having a size 6000 times larger than the sense transistor, a typical voltage headroom $V_{HEAD}$ may be in the order of 200 mV.

The minimum voltage Vdsmin is defined by equation:

$$V_{DS}\min=I_D\max/((W/L)*\mu*C_{OX}(V_{DD}-V_{TH}-V_{HEAD})), \quad (1)$$

where $\mu$ is the charge mobility, Cox the capacitance per unit area of oxide, W and L the width and length of the active area.

When the current is lower than the maximum and the condition is not the worst one, the $V_{DS}$ and the wasted power can be reduced.

Power dissipation can be expressed as:

$$P_{DISS}=V_{OVERHEAD}(\text{Pass-transistor})*I_{CHARGE}, \text{ or} \quad (2)$$

$$P_{DISS}=I_{CHARGE}^2/(\mu C_{OX}*(W/L)(V_{GS}-V_{TH})). \quad (3)$$

Therefore, in order to reduce power dissipation, the difference $V_{GS}-V_{TH}$ of the pass-transistor should be increased. This corresponds to reducing the gate voltage of the pass-transistor. From equation 3 it can be deduced that for very high output currents, power dissipation is relatively low since a gate to source voltage $V_{GS}$ of the pass transistor is close to its maximum value. However, when the output current decreases, a difference $V_{GS}-V_{TH}$ of the pass transistor is reduced, resulting in significant power dissipation.

Figure 2:
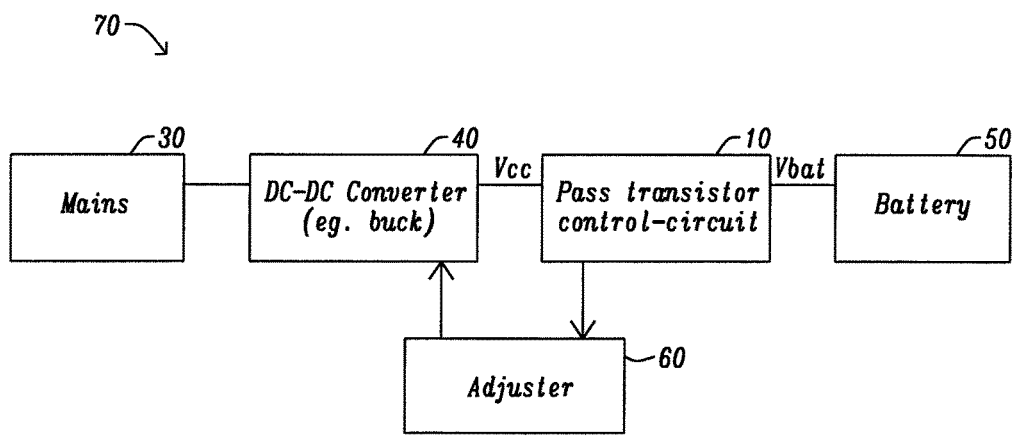
FIG. 2 is a diagram of a linear charger system according to an embodiment of the disclosure.

FIG. 2 shows a linear charger system 70 comprising a mains supply 30 connected to a DC-DC converter 40, a Pass transistor control circuit or current control loop circuit 10, as described above and a battery 50. An adjuster 60 is connected to the circuit 10 and to the DC-DC converter 40 for adjusting an output voltage value Vcc of the DC-DC converter.

Figure 3:
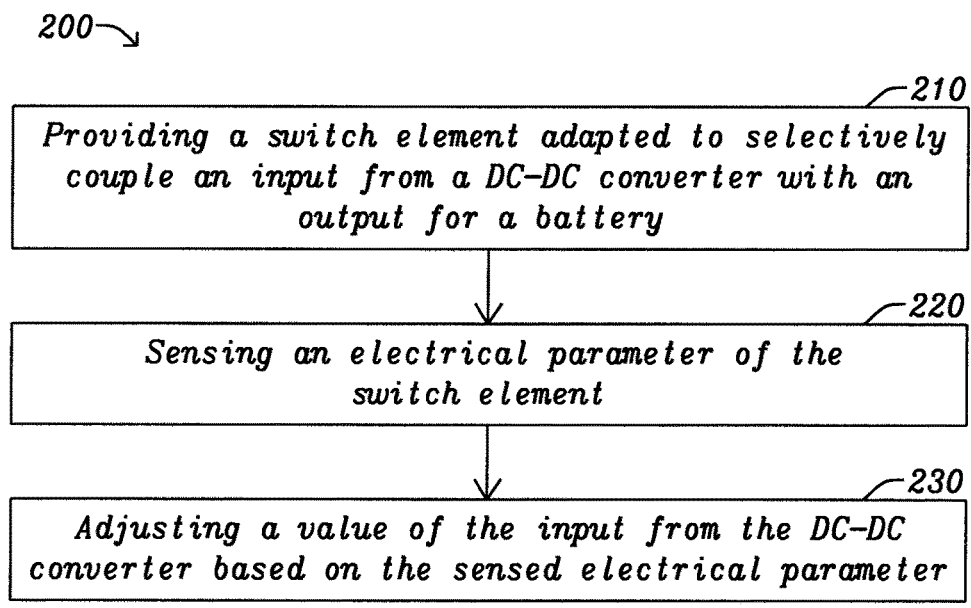
FIG. 3 is a flow diagram of a method of operating a charger.

FIG. 3 shows a flow diagram of a method of operating a charger. Reduction of power dissipation is achieved by i) providing 210 a switch element adapted to selectively couple an input provided by a DC-DC converter with an output for a battery, ii) sensing 220 an electrical parameter of the switch element and iii) adjusting 230 a value of the input provided by the DC-DC converter based on the sensed electrical parameter to reduce power dissipation of the charger. The following examples describe linear chargers equipped with different regulators adapted to adjust the output current Vcc of a DC-DC converter based either on a measurement of a pass transistor gate voltage or a measurement of the charge current.

Figure 4:
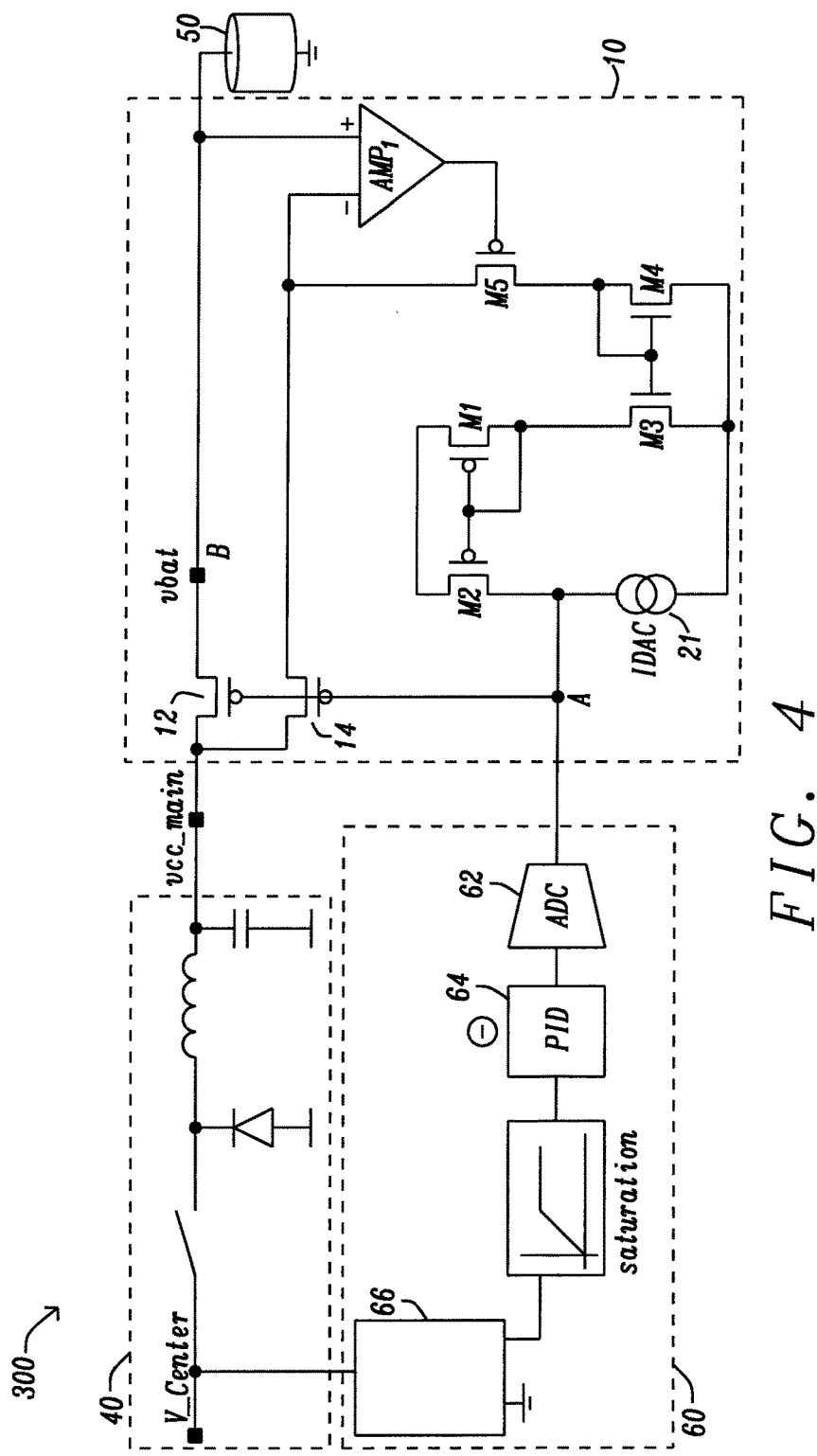
FIG. 4 is a diagram of a charger including a battery charging regulator according to an embodiment of the disclosure.

FIG. 4 shows a linear charger 300 for charging a battery 50, having a buck converter 40, a control circuit 10 as described above and an adjuster 60 also referred to as an overhead control loop, for limiting power dissipation. The adjuster 60, according to this embodiment has an analogue to digital converter ADC 62, coupled to a feedback controller 64, such as a Proportional-Integral-Derivative PID controller, and a buck-controller 66.

Figure 5:
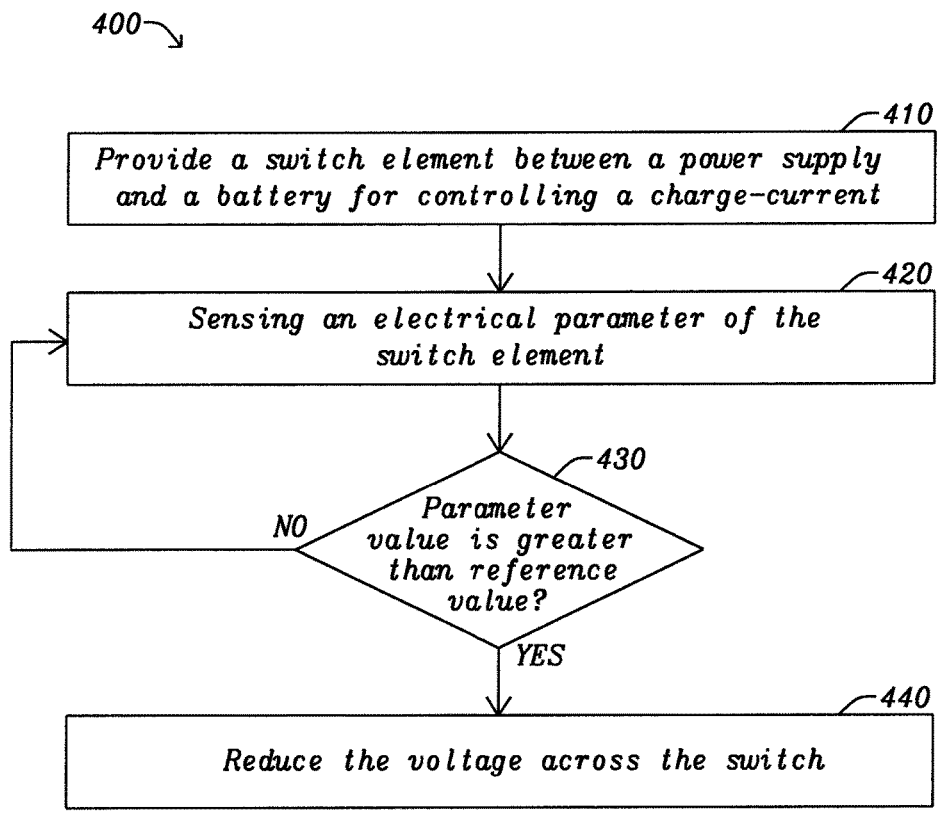
FIG. 5 is a flow diagram of a method of operating a charger using the charger of FIG. 4.

FIG. 5 shows a flow diagram of a method of operating a charger using the system shown in FIG. 4. In operation, the ADC 62 senses 420 the pass-transistor gate voltage at node A. The gate voltage is then digitally processed by the PID 64 which compares 430 the gate voltage value with a reference value. If the gate voltage is less than the reference value, the charger is considered optimised, in this case the output voltage Vcc of the buck is maintained at its present value. If the gate voltage value is above the reference value, the PID 64 generates a signal and sends it to buck controller 66 to reduce the output voltage Vcc of the Buck such that the voltage difference between the buck and the battery is reduced 440. In this way the gate voltage of the pass-transistor is automatically corrected (reduced) by the current-control loop of circuit 10, hence reducing power dissipation.

The reference value may be obtained from a saturation curve reference such as a gate voltage versus overhead voltage curve. Typically, the reference value is greater than the minimum overhead voltage $V_{DSmin}$ allowing the current generator to work properly. For example, the reference value may be 300 mV.

The adjuster 60, is preferably designed to operate at a frequency lower than a frequency of the pass transistor control-circuit 10, in order to prevent the adjuster 60 from interfering with the control-circuit 10. For example, the frequency of the adjuster may be an order of magnitude slower than the frequency of the current control loop. As an example, if the frequency of the current control loop is 10 Hz the frequency of the adjuster may be set to 1 Hz.

The adjuster 60 preferably has also a low saturation threshold. This is because the level of precision of how the current is sensed varies with $V_{DS}$. When $V_{DS}$ drops below a certain value the precision drops too. For this reason, a potential $V_{DS}$ mismatch between the pass transistor and the sense transistor should be very low. In the context of our specific example, a $V_{DS}$ mismatch between the pass transistor and the sense transistor should be at least lower than about 200 or 300 µV in order to implement such a solution. Typically, Vds should not drop below 30 mV.

In order to avoid any overshoot, charging should be started with a low charge current value. The low frequency of the overhead control loop 60 sets a time required for the charge current to reach a desired value and prevents overshoot. The maximum charge current can be reached only when the overhead Vds is high enough to maintain the gate voltage of the pass-transistor at a value sufficient to maintain operation of the pass-transistor circuit 10. In the context of our specific example Vds should be higher than 30 mV.

Figure 6:
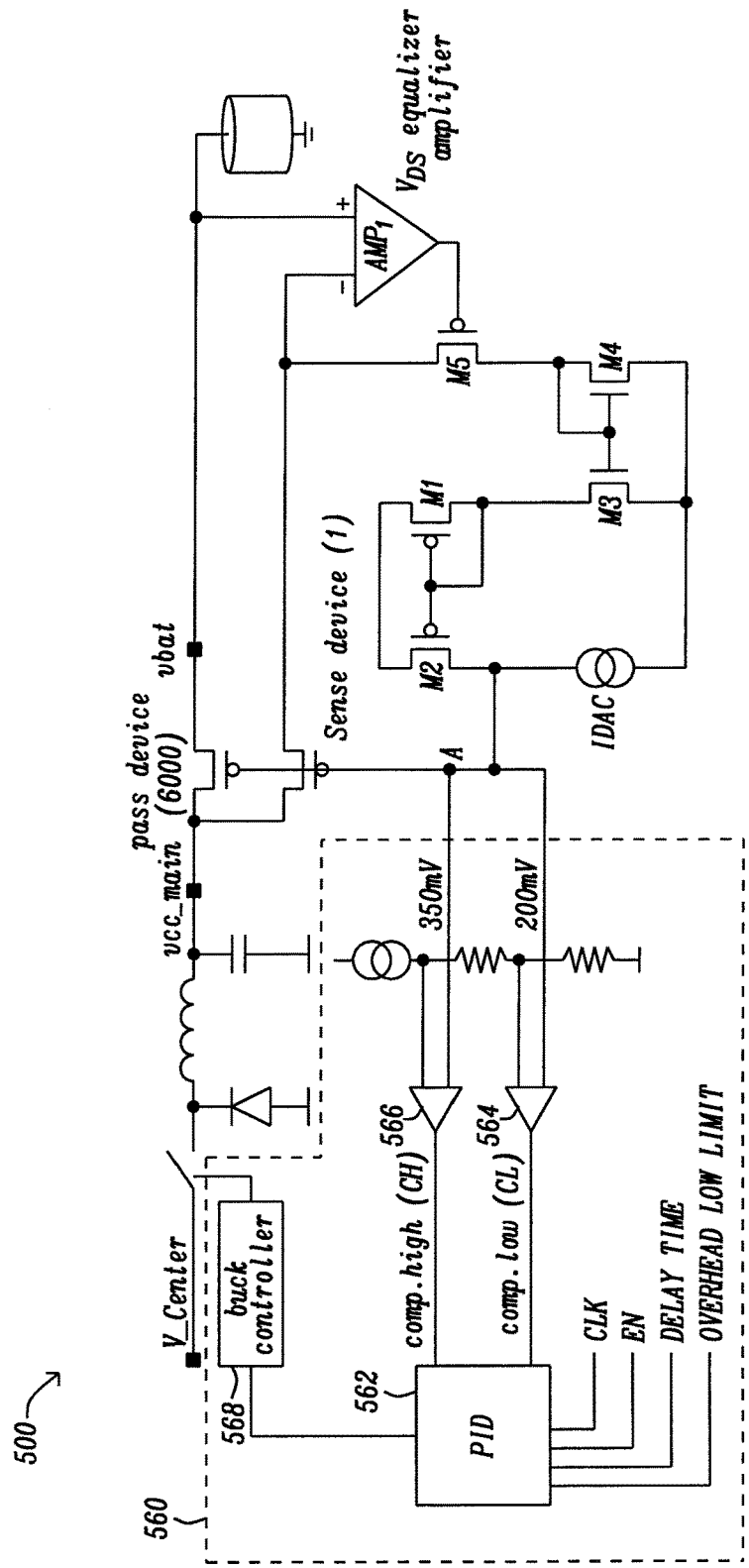
FIG. 6 is a diagram of a charger including a battery charging regulator according to a second embodiment of the disclosure.

FIG. 6 shows a linear charger 500 having an adjuster 560 for limiting power dissipation. The adjuster 560 has a PID 562 coupled to buck controller 568, and to operational amplifiers 564 and 566 (referred to as a low comparator and a high comparator respectively). The low comparator 564 has a non-inverting input connected to a low reference voltage, in this example 200 mV, and an inverting input connected the gate voltage of the pass transistor at node A. The high comparator 566 has a non-inverting input connected to a high reference voltage, in this example 350 mV, and an inverting input connected the gate voltage of the pass transistor at node A. The PID 562 has inputs that include one input from each of the high and low comparators, an enable input, an input delay time, an input clock, and an Input Overhead Low Limit (OLL). The low comparator input CL can take the value 0 or 1, depending on whether the gate voltage Vg is less or more than the low reference value. For example, CL=1 when the gate voltage >200 mV and CL=0 otherwise. The high comparator input CH can take the value 0 or 1, depending on whether the gate voltage Vg is less or more than the high reference value. For example, CH=1 when the gate voltage >350 mV and CL=0 otherwise. The enable input is controlled internally and enables a control logic of the buck controller. The input delay time sets a delay time of when the output is available. For example, the delay time may set to a few milliseconds. The input clock is set to a relatively a low frequency value. For example, the input clock may be set at 2 KHz or other suitable value in order to limit power consumption. The Input Overhead Low Limit (OLL) can be an input word or an analog signal used to set a low overhead limit. If the overhead is well defined by an input word the low overhead limit should be set as such, otherwise OLL should be an analogue signal that flags out when the low overhead limit has been reached. The PID has one output, the Output Buck Control which provides an input for the buck controller.

Figure 7:
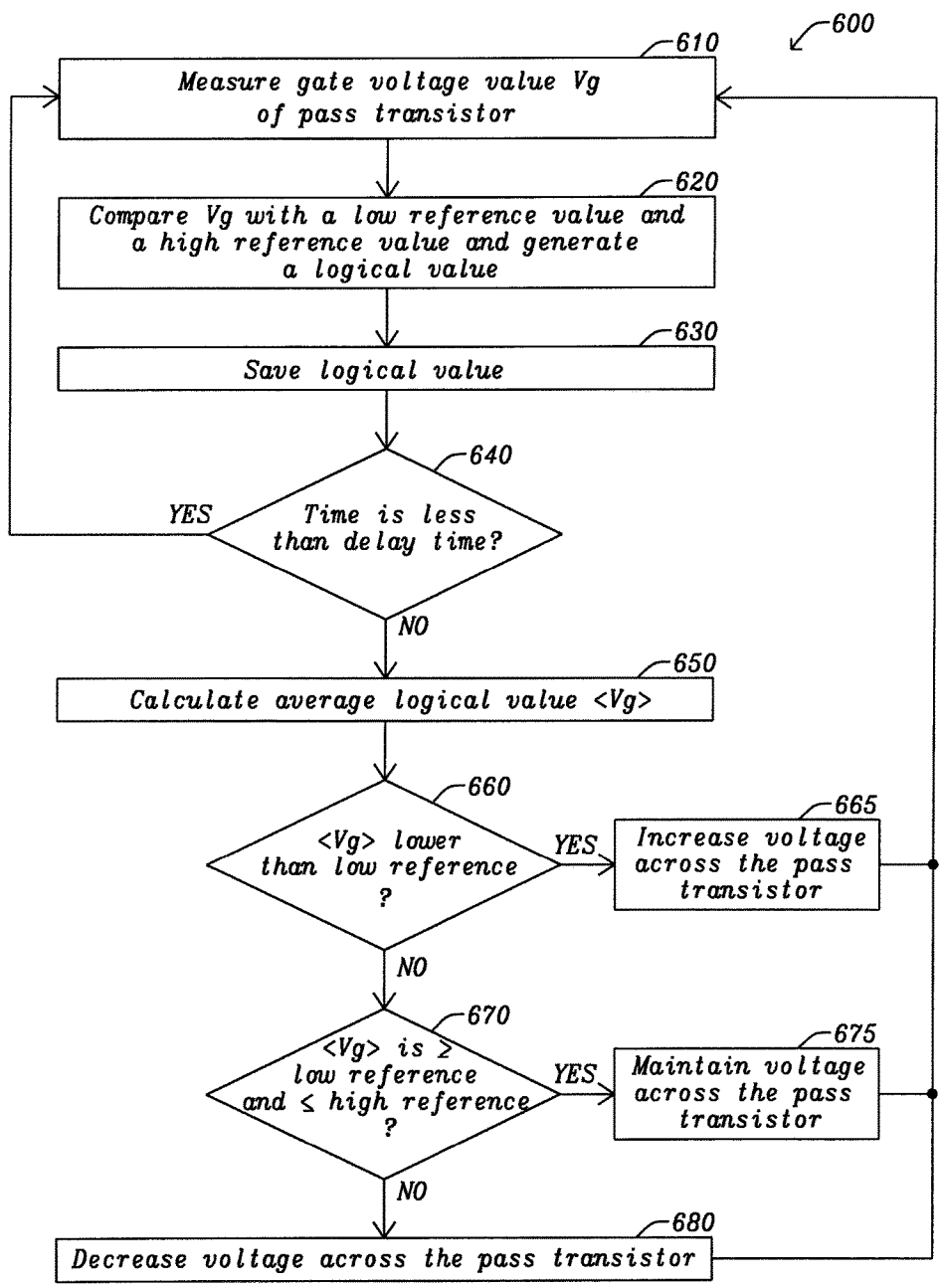
FIG. 7 is a flow diagram of a method of operating a charger using the charger of FIG. 6.

FIG. 7 shows a flow diagram of a method of operating a charger using the system shown in FIG. 6. In operation, the low comparator 564 senses 610 the gate voltage of the pass transistor and compares 620 the gate voltage with the low reference value, for example 200 mV. The low comparator transmits a signal indicating whether the gate voltage is higher or lower than the low reference value to the PID 562. The signal sent by the comparator to the PID is then transformed into a logical 0 or a logical 1 by the PID. If the gate voltage is higher than the low reference value, the signal is transformed into a logical 1. If the gate voltage is lower than the low reference value, the signal is transformed into a logical 0. The high comparator 566 senses 610 the gate voltage of the pass transistor and compares 620 the gate voltage with the high reference value, for example 350 mV. The high comparator transmits a signal indicating whether the gate voltage is higher or lower than the high reference value to the PID 562. The signal sent by the comparator to the PID is then transformed into a logical 0 or 1 by the PID. If the gate voltage is higher than the high reference value, the signal is transformed into a logical 1. If the gate voltage is lower than the high reference value, the signal is transformed into a logical 0.

The PID 562 operates like a counter; when it is enabled the PID saves 630 the logical value derived from the gate voltage and averages 650 as many samples as possible during the delay time DT set in the PID 640. The output of the PID is then sent to the buck controller 568 to set the output voltage Vcc of the buck converter.

If the gate voltage is less 660 than the low 200 mV reference value (CL=0, CH=0), then the PID 562 generates a signal to send to the buck controller 568 in order to increase 665 the output voltage of the buck by one step. For example, Vcc may be increased by 10 mV. This results in an increase in the overhead voltage Vds across the pass transistor. If the overhead has reached its low limit OLL then Vcc is left equal to its previous value.

If (at step 670) the gate voltage is between the low reference and the high reference i.e between 200 mV and 350 mV (CL=1, CH=0), then the gate voltage is considered within an optimum region and the PID 562 does not generate any signal. In this case the overhead Vds across the pass transistor is maintained 675 and remains unchanged.

If (at step 670) the gate voltage is greater than the high 350 mV reference (CL=1, CH=1), then the PID 568 generates a signal to send to the buck controller 568 to decrease the output voltage of the buck by one step. For example, Vcc may be decreased by 10 mV. This results in a decrease 680 in the overhead voltage Vds across the pass transistor. Such a cycle may be repeated until the PID reaches the overhead low limit. At this point Vcc is left equal to its previous value. Depending on how the overhead control is performed the low overhead limit should be reached either when it is flagged by the external digital input or when the output overhead is equal to the overhead value set at the input of the PID.

Depending on specific chip design an additional device may be required to detect when the Vds decreases below the minimum voltage. In this case the device output should be used as input of the PID. For completeness it is noted that the situation CH=1, CL=0 is not possible.

Figure 8:
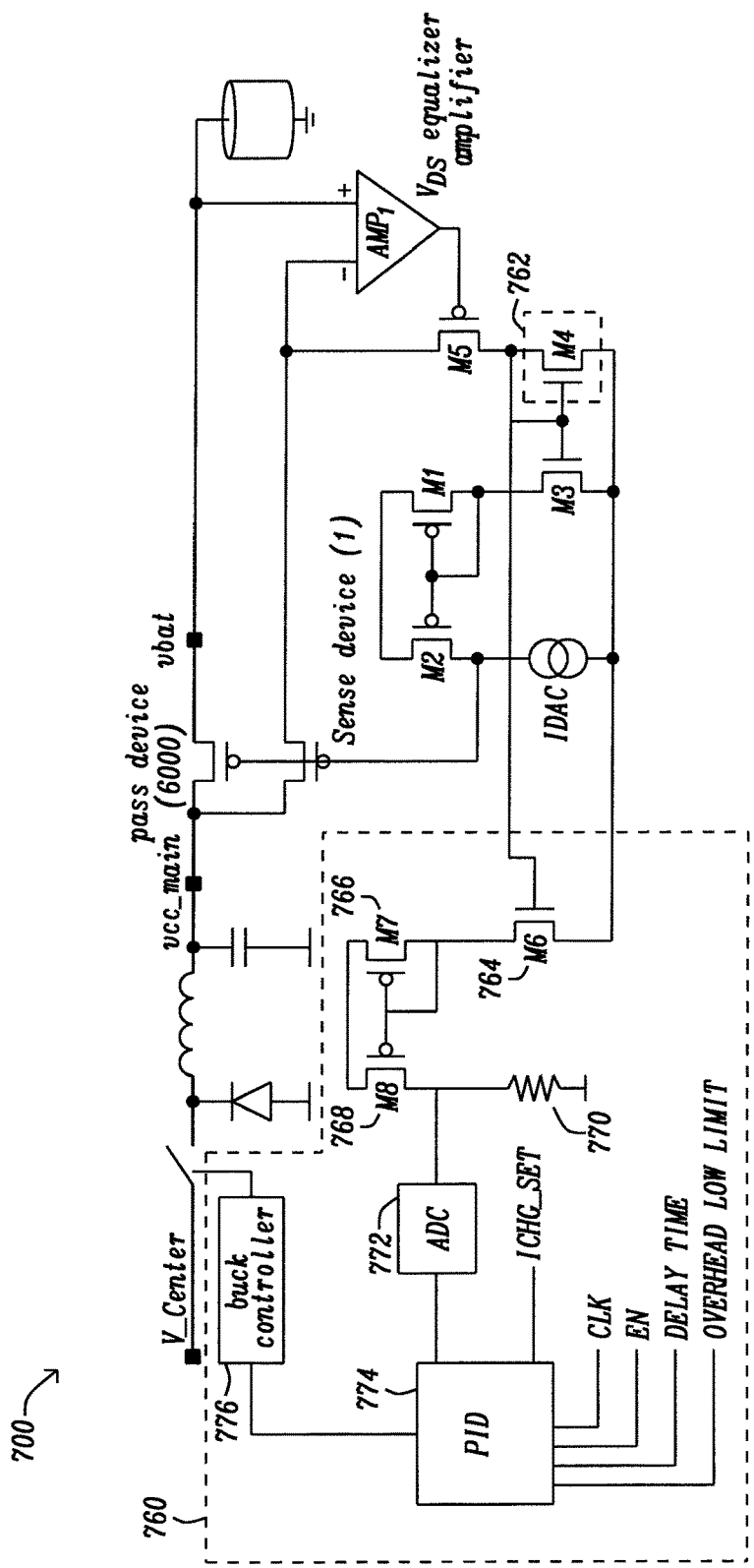
FIG. 8 is a diagram of a charger including a battery charging regulator according to a third embodiment of the disclosure.

FIG. 8 shows a linear charger 700 having an adjuster 760 for limiting power dissipation. The adjuster 760 has a current mirror including four transistors 762, 764, 766, and 768, a resistor 770, an ADC 772, a PID 774 and a buck controller 776. The ADC 772 has an input connected to the current mirror and an output connected to the PID 774.

The PID 774 has inputs that include one input from the ADC, a charge current input (ICHG_SET), an enable input, an input delay time, an input clock, and an Input Overhead low Limit (OLL). The PID has also an output, the Output buck Control connected to the buck controller 776.

The ADC input to the PID provides a digital value of the charge current. The charge current input is used to set the desired charge current. The charge current is used to set the overhead voltage. The enable input enables the control logic of the buck controller. It is controlled internally. The input delay time sets a delay time of when the output is available. The input clock is set to a relatively a low frequency value. For example, the input clock may be set at 2 KHz or other suitable value in order to limit power consumption. The Input Overhead Low Limit (OLL) can be an input word or an analog signal used to set a low overhead limit.

Figure 9:
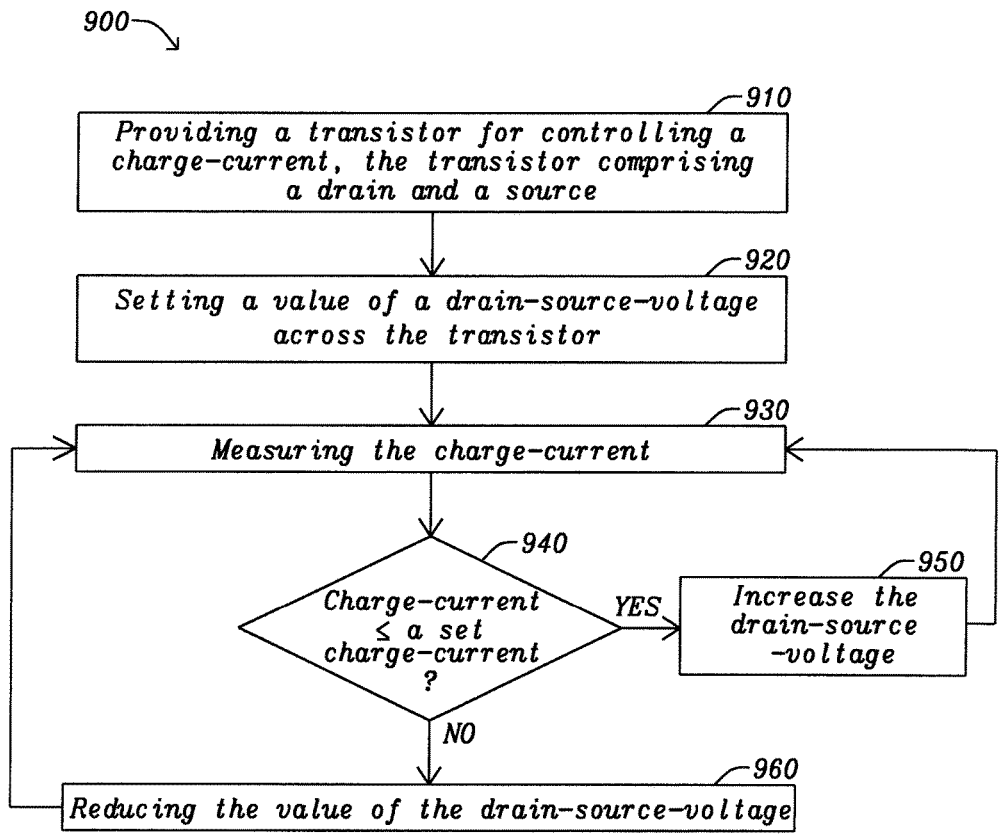
FIG. 9 is a flow diagram of a method of operating a charger using the charger of FIG. 8.

FIG. 9 shows a flow diagram of a method of operating a charger using the system shown in FIG. 8. In operation the buck controller sets 920 an initial output voltage Vcc_main of the buck. The initial Vcc value should be larger than the battery voltage Vbat, such that the overhead voltage Vds is large enough for the pass transistor control circuit 10 to regulate the charge current. A typical overhead voltage may be 200 mV. The current in the sense device is mirrored through transistors 762, 764, 766, and 768, to the resistor 770. The current in the sense device is proportional to the charge current by a multiplication factor that is a function of the relative size of the sense transistor compared to the pass transistor. For this reason, the current in the sense device is a replica of the charge current. The charge current replica is measured 930 by the ADC 772. The measured charge current value is then compared 940 to a set value for the charge current. The PID 774 controls the buck controller 776 to adjust the overhead voltage Vds from Vcc_MAIN to VBAT accordingly.

If the charge current is greater than the set value for the charge current, then the PID 774 generates a signal to send to the buck controller 776 in order to reduce 960 the output voltage of the buck by one step. For example, Vcc may be decreased by 10 mV. This results in a decrease in the overhead voltage Vds across the pass transistor. If the overhead has reached its low limit OLL then Vcc is left equal to its previous value. The charge current is then measured 930 again via the ADC and current mirror. The PID controls iterative reduction of the overhead voltage until a value of the charge current is measured below its set value.

If the value of the charge current is measured equal to its set value, the PID generates a signal to send to the buck controller 776 in order to reduce further the output voltage of the buck. For example, Vcc may be decreased by 10 mV.

If the value of the charge current has reduced below its set value, the PID generates a signal to send to the buck controller 776 in order to increase 950 the output voltage Vcc of the buck back to its previous value, such that the charge current remains at its set value.

Figure 10:
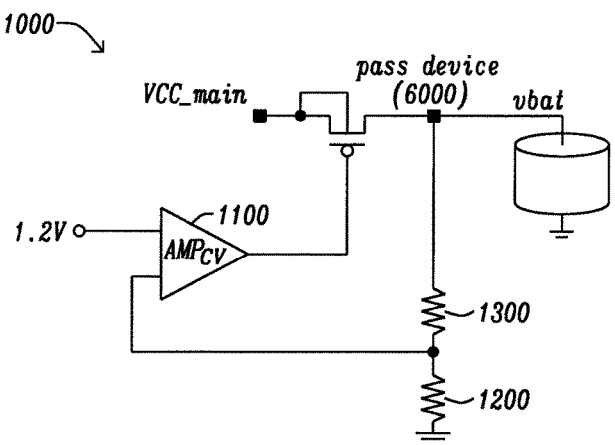
FIG. 10 is a diagram of a constant voltage loop.

FIG. 10 shows a diagram of a constant voltage loop 1000 for charging a battery. The voltage loop has an operational amplifier 1100 and two resistances 1200, 1300 forming a potential divider. The operational amplifier 1100 has non-inverting input connected to a reference voltage of 1.2 V, and an inverting input connected to the Battery voltage Vbat via the potential divider. The output of the operative amplifier is connected to the gate of the pass transistor. The reference voltage sets the target voltage of the battery.

A battery charging process typically comprises both a constant current stage and a constant voltage stage. At first the battery is charged with a constant current, then when the battery is almost fully charged the battery is charged with a constant voltage. The diagram of FIG. 10 represents a constant voltage loop for providing a constant voltage to the battery. Such a loop may be implemented in addition to and/or in combination with the current control loop and overhead control loop described above in FIGS. 4, 6 and 8. When the battery voltage is close to a target voltage, the voltage control loop takes over and there is no control on the current any longer. Once the voltage loop takes over the control of the charging operation, the current is lower than the one set by the current control loop. In fact, the overhead Vds can be decreased according with the same algorithm shown above.

A skilled person will appreciate that variations of the disclosed arrangements are possible without departing from the disclosure. Accordingly, the above description of the specific embodiment is made by way of example only and not for the purposes of limitation. For example, the incremental algorithms described above, could be adapted to change the frequency and the precision of the control loop. It will be clear to the skilled person that minor modifications may be made without significant changes to the operation described.

What is claimed is:

1. A battery charging regulator for use with a charger comprising:
    a switch element comprising a control terminal and first and second path terminals located at a first and a second end of a conductive path respectively; the switch element being adapted to selectively couple an input provided by a DC-DC converter with an output for a battery;
    a control-circuit coupled to the switch element, adapted to adjust an input to the control terminal to regulate at least one of a charge current and a charge voltage supplied to the battery via the conductive path; and
    an adjuster-circuit coupled to the switch element, adapted to sense a gate voltage of the switch element; and to adjust a value of the input provided by the DC-DC converter based on the sensed gate voltage.

2. The battery charging regulator as claimed in claim 1, wherein the adjuster-circuit comprises
    a comparison circuit adapted to compare the gate voltage of the switch element with at least one reference value; and
    a controller connected to the comparison circuit adapted to control the input provided by the DC-DC converter, based on a comparison result obtained by the comparison circuit.

3. The battery charging regulator as claimed in claim 2, wherein the comparison circuit is adapted to send a signal to the controller to reduce a value of the input provided by the DC-DC converter upon identifying the gate voltage of the switch element is greater than the at least one reference value.

4. The battery charging regulator as claimed in claim 2, wherein the at least one reference value is obtained from a saturation curve reference.

5. The battery charging regulator as claimed in claim 2, wherein the at least one reference value includes a low reference value and a high reference value, wherein the high reference value is greater than the low reference value and wherein the comparison circuit is adapted to send a signal to the controller to perform at least one of increasing the value of the input provided by the DC-DC converter upon identifying the gate voltage is less than the low reference value;

maintaining the value of the input provided by the DC-DC converter upon identifying the gate voltage is at least equal to the low reference value and less than the high reference value; and reducing the value of the input provided by the DC-DC converter upon identifying the gate voltage is greater than the high reference value.

6. The battery charging regulator as claimed in claim 3, wherein the comparison circuit is adapted to calculate an average value of the gate voltage of the switch element, and wherein the signal is based on the average value.

7. The battery charging regulator as claimed in claim 2, wherein the comparison circuit is adapted to generate a logical value associated with the gate voltage based on a comparison of the gate voltage with the at least one reference value.

8. The battery charging regulator as claimed in claim 1, wherein the control circuit comprises a scaled switch element, the scaled switch element being smaller than the switch element, an operational amplifier, and a current generator.

9. The battery charging regulator as claimed in claim 1, wherein the control terminal is a gate, the first path terminal is a source and the second path terminal is a drain and wherein the input provided by the DC-DC converter provides a source voltage of the switch element.

10. The battery charging regulator as claimed in claim 9, wherein the control circuit is adapted to maintain the charge current at a constant value regardless of the source voltage of the transistor.

11. The battery charging regulator as claimed in claim 1, wherein the adjuster-circuit is adapted to adjust the value of the input provided by the DC-DC converter iteratively towards a threshold value.

12. The battery charging regulator as claimed in claim 1, wherein the adjuster-circuit is adapted to operate at a first frequency and wherein the control-circuit is adapted to operate at a second frequency, and wherein the first frequency is less than the second frequency.

13. The battery charging regulator as claimed in claim 12, wherein the first frequency is about one order of magnitude lower than the second frequency.

14. The battery charging regulator of claim 1, wherein the adjuster-circuit comprises a feedback controller coupled to at least one of an Analogue to Digital Converter and an operational amplifier.

15. A method of operating a charger comprising the steps of:

providing a switch element adapted to selectively couple an input provided by a DC-DC converter with an output for a battery;

sensing a gate voltage of the switch element; and adjusting a value of the input provided by the DC-DC converter based on the sensed gate voltage.

16. The method of claim 15, wherein adjusting comprises the steps of:

comparing the gate voltage of the switch element with at least one reference value; and reducing a value of the input provided by the DC-DC converter upon identifying the gate voltage of the switch element is greater than the at least one reference value by sending a signal to a controller.

17. The method of claim 16, wherein the at least one reference value includes a low reference value and a high reference value, wherein the high reference value is greater than the low reference value, the method further comprising sending a signal to a controller to perform at least one of increasing the value of the input provided by the DC-DC converter upon identifying the gate voltage is less than the low reference value;

maintaining the value of the input provided by the DC-DC converter upon identifying the gate voltage is at least equal to the low reference value and less than the high reference value; and reducing the value of the input provided by the DC-DC converter upon identifying the gate voltage is greater than the high reference value.

18. The method of claim 16, further comprising the step of: calculating an average value of the gate voltage of the switch element, and wherein the signal is based on the calculated average value.

19. The method of claim 15, further comprising the step of: generating a logical value associated with the gate voltage based on a comparison of the gate voltage with the at least one reference value.

20. The method of claim 15, wherein the switch element comprising a source; and wherein adjusting the value of the input provided by the DC-DC converter comprises adjusting a source voltage of the switch element.

21. The method of claim 15, wherein adjusting the source voltage of the switch element is performed iteratively towards a threshold value.

22. The method of claim 21, wherein the threshold value is a minimum voltage value sufficient to maintain operation of the control circuit.

23. The method of claim 15, wherein adjusting a value of the input provided by the DC-DC converter is performed at a frequency that is less than a frequency of operation of a control circuit adapted to regulate at least one of the charge current and a charge voltage supplied to the battery.

24. A charger for charging a battery comprising a DC-DC converter and a battery charging regulator, comprising:

a switch element comprising a control terminal and first and second path terminals located at a first and a second end of a conductive path respectively; the switch element being adapted to selectively couple an input provided by a DC-DC converter with an output for a battery;

a control-circuit coupled to the switch element, adapted to adjust an input to the control terminal to regulate at least one of a charge current and a charge voltage supplied to the battery via the conductive path; and an adjuster-circuit coupled to the switch element, adapted to sense a gate voltage of the switch element; and to adjust a value of the input provided by the DC-DC converter based on the sensed gate voltage sensed electrical.

25. A portable electronic device comprising a charger for charging a battery comprising a DC-DC converter and a battery charging regulator, comprising:

a switch element comprising a control terminal and first and second path terminals located at a first and a second end of a conductive path respectively; the switch element being adapted to selectively couple an input provided by a DC-DC converter with an output for a battery;

a control-circuit coupled to the switch element, adapted to adjust an input to the control terminal to regulate at least one of a charge current and a charge voltage supplied to the battery via the conductive path; and an adjuster-circuit coupled to the switch element, adapted to sense a gate voltage of the switch element; and to adjust a value of the input provided by the DC-DC converter based on the sensed gate voltage.

* * * * *

UNITED STATES PATENT AND TRADEMARK OFFICE
CERTIFICATE OF CORRECTION

PATENT NO. : 10,141,764 B2
APPLICATION NO. : 15/335934
DATED : November 27, 2018
INVENTOR(S) : Danilo Gerna et al.

Page 1 of 1

It is certified that error appears in the above-identified patent and that said Letters Patent is hereby corrected as shown below:

In the Claims

Column 12, Lines 57-58, delete "sensed electrical." and replace with -- . --

Signed and Sealed this
Eighteenth Day of June, 2019

Andrei Iancu
*Director of the United States Patent and Trademark Office*